United States Patent [19]
Chen

[11] Patent Number: 5,743,647
[45] Date of Patent: Apr. 28, 1998

[54] PACIFYING AND TEMPERATURE MEASURING MEANS

[76] Inventor: Chean-Shui Chen, c/o Hung Hsing Patent Service Center P.O. Box 55-1670, Taipei, Taiwan

[21] Appl. No.: 615,413
[22] Filed: Mar. 14, 1996
[51] Int. Cl.⁶ .................................................. G01K 13/00
[52] U.S. Cl. ............................ 374/151; 374/208; 128/736
[58] Field of Search ................................ 374/151, 158, 374/163, 208, 209; 128/736; 215/11.2; 606/234, 235, 236

[56] References Cited

U.S. PATENT DOCUMENTS

| | | |
|---|---|---|
| 5,109,864 | 5/1992 | Lu .................................. 374/151 |
| 5,178,466 | 1/1993 | Chiu ............................... 374/151 |
| 5,178,467 | 1/1993 | Chien .............................. 374/151 |
| 5,312,187 | 5/1994 | Chiu ............................... 374/151 |
| 5,611,622 | 3/1997 | Wang .............................. 374/151 |

Primary Examiner—G. Bradley Bennett

[57] ABSTRACT

A pacifying and temperature measuring device includes a pacifier having a coupling member secured on a rear portion of the pacifier, and an electronic clinical thermometer having at least a projection formed on a probe portion of the thermometer to be engageable with an annular retaining portion formed on the coupling member of the pacifier, whereby upon decoupling of the electronic clinical thermometer from the pacifier, the pacifier, as free from sophisticated electronic device, may be sunk into a boiling-water bath for sterilization without damaging the electronic clinical thermometer already separated from the pacifier.

1 Claim, 6 Drawing Sheets

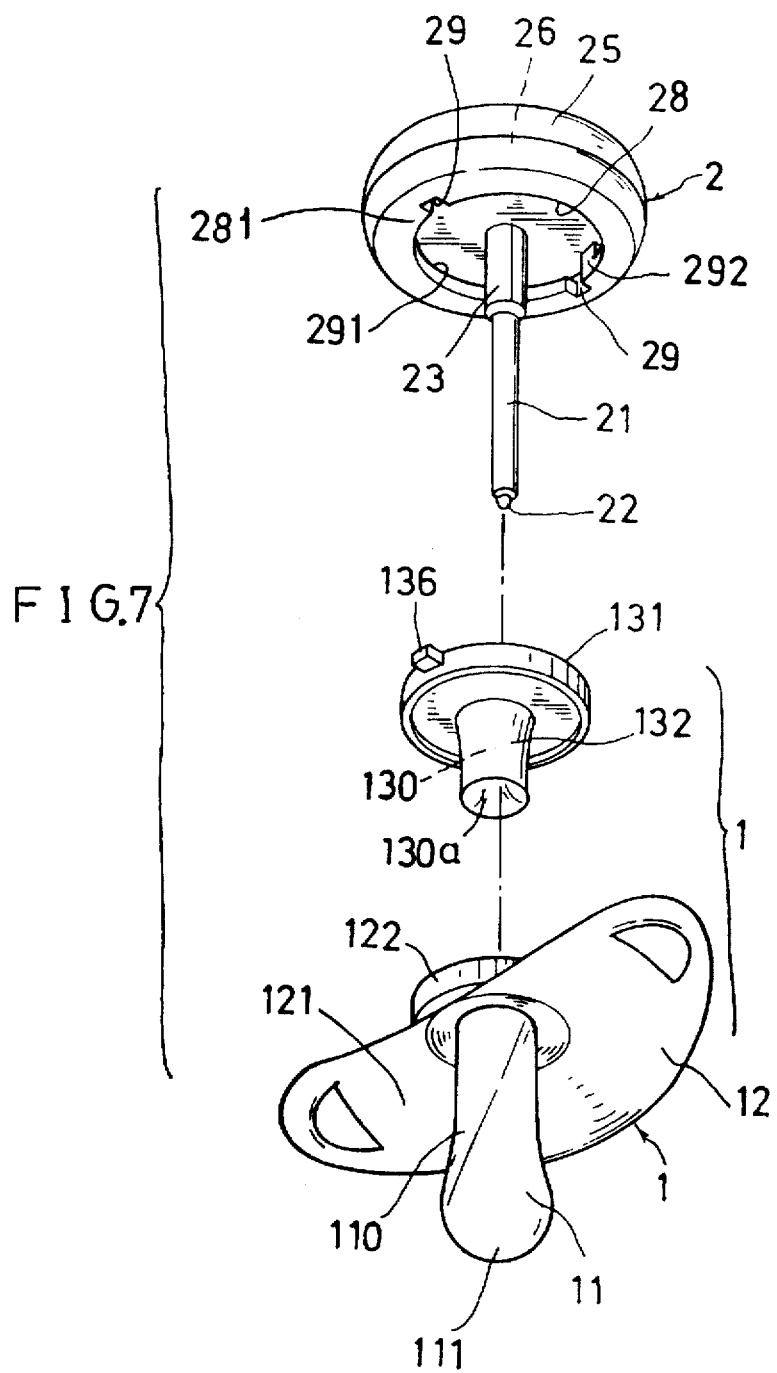

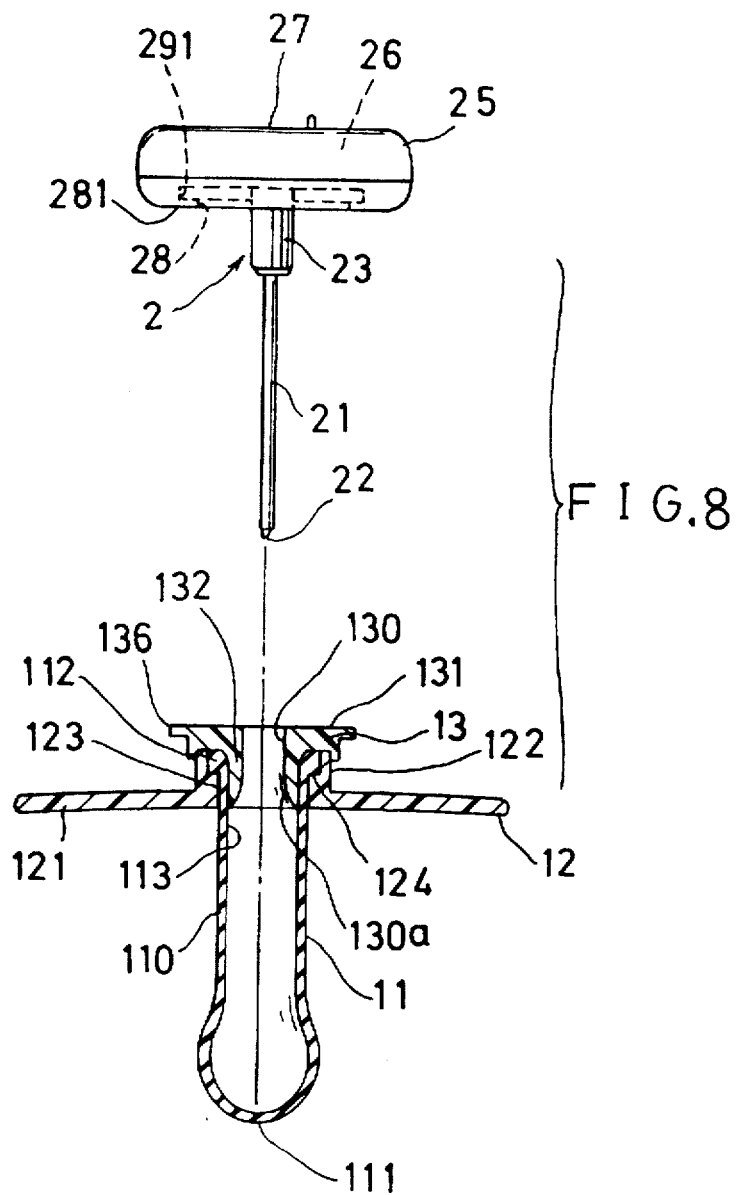

5,743,647

1

PACIFYING AND TEMPERATURE MEASURING MEANS

BACKGROUND OF THE INVENTION

U.S. Pat. No. 5,178,467 entitled "Clinic Thermometer with Soother" also granted to the same inventor of this application disclosed a clinic thermometer having a thermometer body which may be selectively coupled to a soother (50) for baby use or coupled to a hollow probe (90) for adult use.

However, such a conventional clinic thermometer with soother has the following drawbacks:

1. Once the soother (50) is coupled with the thermometer body (10) for temperature measurement and soothing uses, it can not be sterilized in a boiling-water bath because the electronic circuit and digital display in the thermometer body (10) will be damaged by heat and moisture of boiling water.

So, when it is intended to sterilize the soother by boiling water, the thermometer body (10) should be dismantled and decoupled from the soother (50), causing great inconvenience.

2. Even the thermometer body (10) is dismantled and separated from the soother (50), the moisture or water drops of the boiling-water bath may shortcircuit the two contacting members 20 of the electronic temperature processing circuit, thereby influencing a reliable temperature measurement.

3. The production will be difficult which will increase the production cost.

The present inventor has found the drawbacks of the conventional clinic thermometer with soother and invented the present pacifying and temperature measuring means durable for heat, reliable for temperature measurement, and convenient for sterilization.

SUMMARY OF THE INVENTION

The object of the present invention is to provide a pacifying and temperature measuring device including a pacifier having a coupling member secured on a rear portion of the pacifier, and an electronic clinical thermometer having at least a projection formed on a probe portion of the thermometer to be engaged with an annular retaining portion formed on the coupling member of the pacifier, whereby upon decoupling of the electronic clinical thermometer from the pacifier, the pacifier, as free from sophisticated electronic device, may be sterilized in a boiling-water bath without damaging the electronic clinical thermometer.

BRIEF DESCRIPTION OF THE DRAWINGS

FIG. 7 is an exploded view of the elements of another preferred embodiment of the present invention.

2

Figure 1:
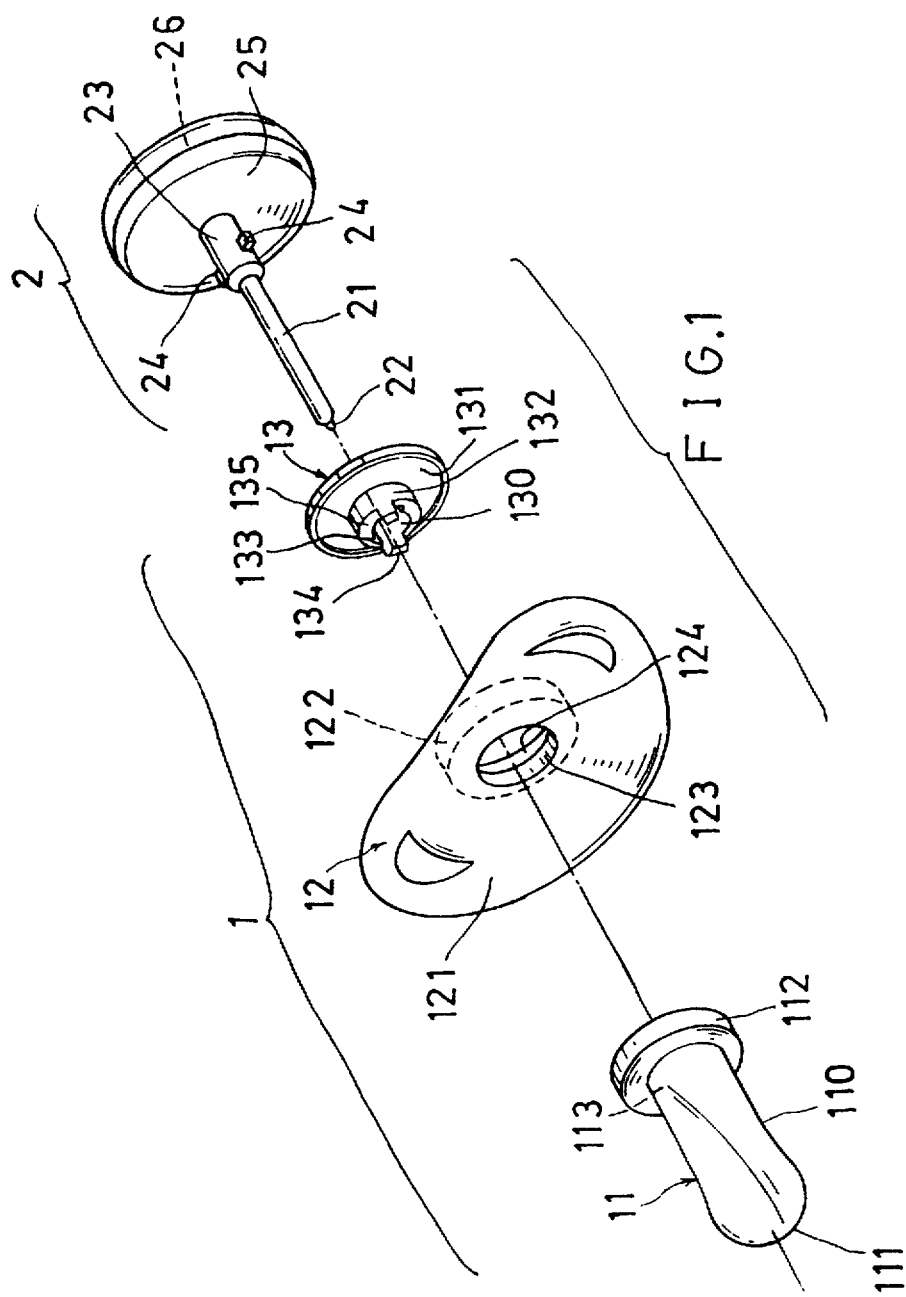
FIG. 1 is an exploded view showing the elements of the present invention.

FIG. 8 is a sectional drawing of the pacifier and the thermometer as shown in FIG. 7.

DETAILED DESCRIPTION

A first preferred embodiment of the pacifying and temperature measuring means of the present invention is shown in FIGS. 1–6, which comprises: a pacifier 1 and an electronic clinical thermometer 2 detachably coupled with the pacifier 1. The pacifier 1 is made of rubber or plastic materials durable for heat and having good heat conductance and heat transfer properties for a good heat conduction between a nipple portion 111 of the pacifier 1 with a temperature sensor 22 of the electronic clinical thermometer 2.

The pacifier 1 includes: a soother member 11, a skirt member 12 secured on a rear portion of the soother member 11, and a coupling member 13 fixed on a rear portion of the soother member 11 and the skirt member 12. The coupling member 13 may be firmly secured on a rear portion of the pacifier 1 by ultrasonic welding or other joining methods.

The soother member 11 includes: a hollow stem portion 110, a nipple portion 111 formed on a front end portion of the hollow stem portion 110 to be inserted into a baby's mouth for soothing purpose, a flange portion 112 formed on a rear end portion of the hollow stem portion 110, and a cylindrical hole 113 formed in the flange portion 112 and in the hollow stem portion 110.

The skirt member 12 includes: a guarding plate 121, a neck portion 122 formed on a central portion of the guarding plate 121, a central through hole 123 formed in the neck portion 122, and an annular recess 124 annularly recessed in a rear end portion of the neck portion 122 of the skirt member 12.

The coupling member 13 includes: a rear cover 131 covering a rear end surface of the flange portion 112 of the soother member 11 and the neck portion 122 of the skirt member 12, a sleeve portion 132 protruding forwardly from the rear cover 131 and engageable with the cylindrical hole 113 of the soother member 11, a shaft hole 130 formed through the sleeve portion 132, a pair of projection holes 133 diametrically formed in a central portion of the sleeve portion 132 each projection hole 133 radially recessed from a perimeter of the shaft hole 130, an annular retaining portion 134 annularly formed on a front or inner end portion of the sleeve portion 132, and a pair of ridge portions 135 diametrically formed on and protruding forwardly or inwardly from the annular retaining portion 134 with each ridge portion 135 contiguous to each projection hole 133. The shaft hole 130 will also serve as a drain opening when removed from a boiling-water bath for draining the water entering the pacifier 1.

The electronic clinical thermometer 2 includes: a probe portion 21 protruding forwardly from a disk portion 25 having a temperature indicating circuit 26 mounted in the disk portion 25 and a digital display 27 formed on a rear surface of the disk portion 25 for visual reading of temperature data as measured by the thermometer 2, a temperature sensor or thermistor 22 formed on a front tip end of the probe portion 21 insertable into the hollow stem portion 110 of the pacifier 1 to contact an inside surface of the nipple portion 111 for sensing temperature in a baby's mouth, a shaft portion 23 protruding forwardly from the disk portion 25 to dispose about the probe portion 21, and a pair of projections 24 diametrically formed on the shaft portion 23 to be engageable with the pair of projection holes 133 formed in the coupling member 13 of the pacifier 1.

The temperature indicating circuit 26 includes: a temperature oscillating circuit, a temperature processing circuit and other related electronic circuitry connected between the sensor 22 and the display 27 for processing the temperature signal as sensed by the sensor 22 to be displayed on the display 27. The temperature indicating circuit 26 is a conventional art and may be modified by those skilled in the art.

The pair of projections 24 and the projections holes 133 may also be simplified to be single projection 24 on the shaft portion 23 or single projection hole 133 in the coupling member 13.

The probe portion 21 and the shaft portion 23 may be integrally formed as a flexible probe by those skilled in the art. Other coupling and decoupling mechanisms may be modified for detachably connecting the pacifier 1 with the thermometer 2.

Figure 3:
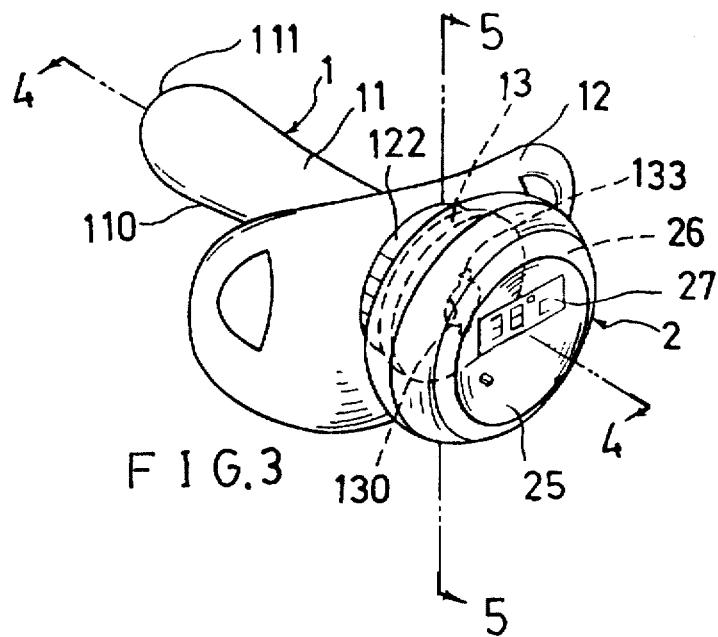
FIG. 3 is a perspective view of the the present invention when assembled.
Figure 4:
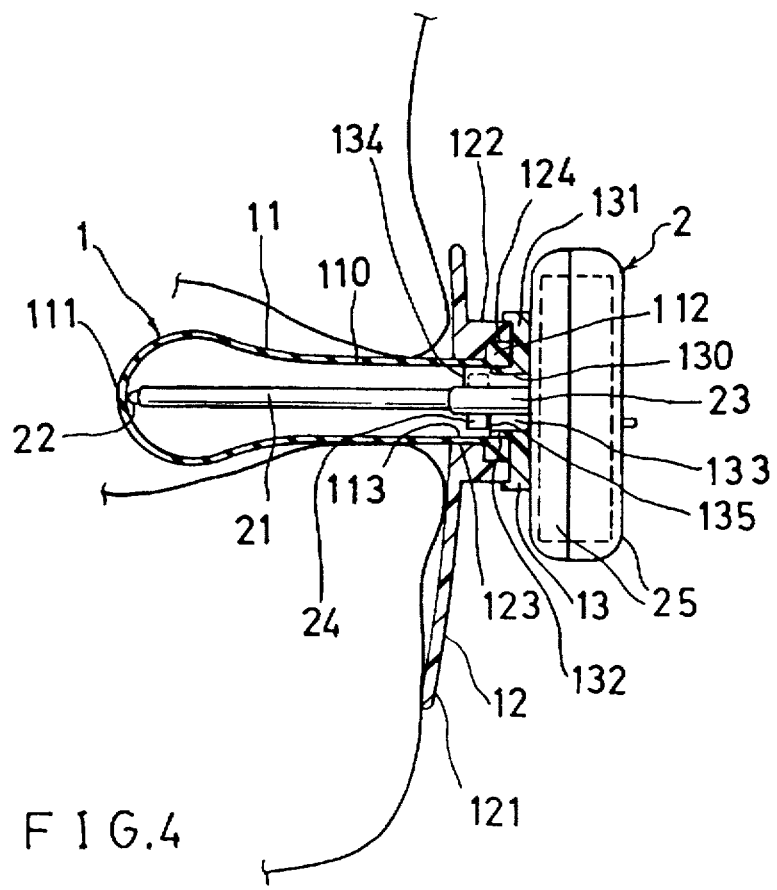
FIG. 4 is a longitudinal sectional drawing of the present invention as viewed from 4—4 direction of FIG. 3.

As shown in FIGS. 3, 4, the flange portion 112 of the soother member 11 is engaged with the annular recess 124 on the neck portion 122 of the skirt member 12, the sleeve portion 132 of the coupling member 13 is engaged with the cylindrical hole 113 of the soother member 11; and the rear cover 131 is contacted with a rear surface of the flange portion 112 of the soother member 11 and contacted with a rear surface of the neck portion 122 of the skirt member 12; whereby upon joining of the coupling member 13 with the neck portion 122 of the skirt member 12 and with the flange portion 112 of the soother member 11, the pacifier 1 will be integrally formed for pacifying a baby even not coupled with the thermometer 2.

The shapes and structure of the pacifier 1 of the present invention are not limited, which may be modified by those skilled in the art.

Figure 2:
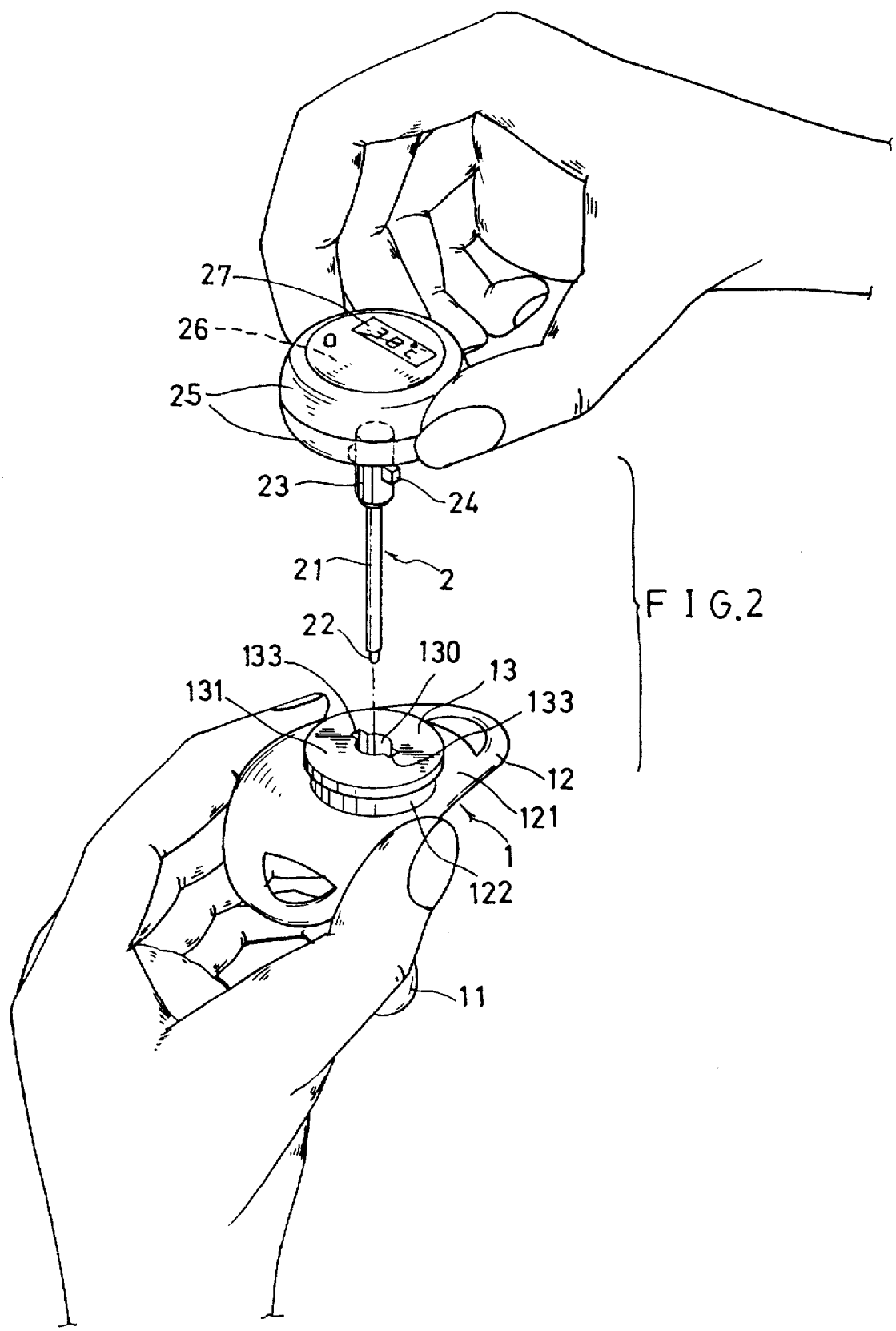
FIG. 2 is an illustration showing a coupling of the thermometer with the pacifier in accordance with the present invention.
Figure 5:
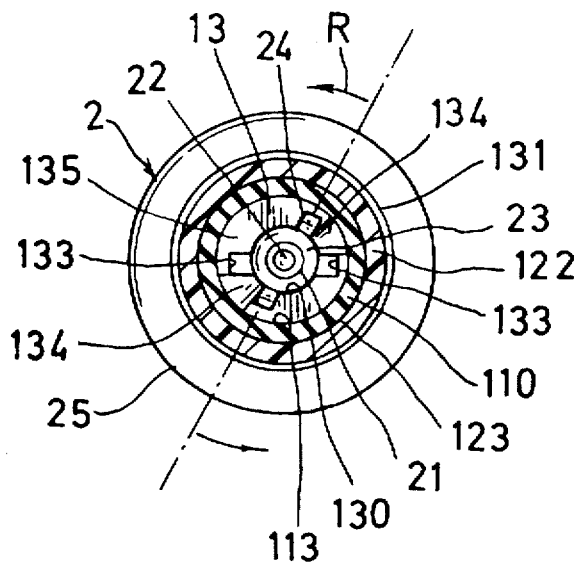
FIG. 5 is a cross sectional drawing of the present invention when viewed from 5—5 direction of FIG. 3.
Figure 6:
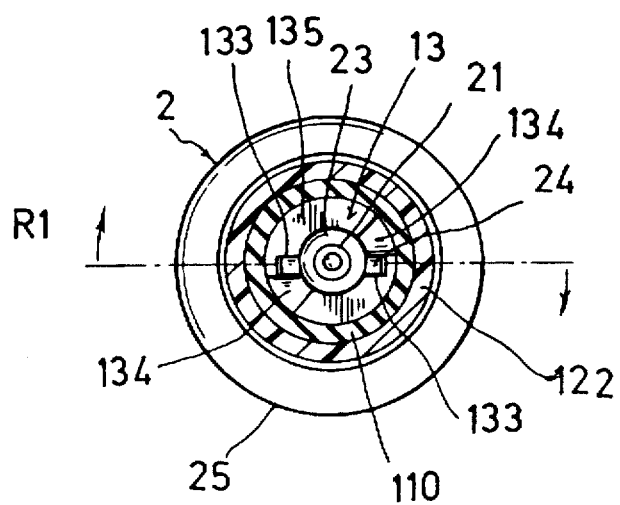
FIG. 6 is an illustration when rotating the projections on the thermometer of the present invention from FIG. 5.

For pacifying and temperature measuring such as in a baby's mouth, the electronic clinical thermometer 2 may be coupled with the pacifier 1 by aligning and engaging the projections 24 on the thermometer 2 with the projection holes 133 in the coupling member 13 as shown in FIG. 2 and by protruding the shaft portion 23 of the thermometer 2 into the shaft hole 130 in the coupling member 13 until the disk portion 25 contacts the rear cover 131 of the coupling member 13. The projections 24 are now positioned beyond the annular retaining portion 134 of the coupling member 13. Upon rotation (R) as shown in FIG. 5 of the disk portion 25 and the shaft portion 23 to deviate the projections 24 from projection holes 133 as shown in FIG. 6, the projections 24 are retained against the annular retaining portion 134 of the coupling member 13 to "lock" the thermometer 2 with the pacifier 1. The sensor 22 at the front end of the probe portion 21 is contacted with an inside surface of the nipple portion 111 to sense the temperature of the baby's mouth to be processed by the temperature indicating circuit 26 which is electrically connected with the sensor 22 for temperature indication to be displayed on the digital display 27.

When rotating the disk portion 25 in a reverse direction (R1) as shown in FIG. 6 to rotate each projection 24 to match with the projection hole 133, the thermometer 2 may then be decoupled from the pacifier 1 by withdrawing the shaft portion 23 from the shaft hole 130 in the coupling member 13. The pacifier 1 itself may then be sunk into a boiling-water bath (not shown) for sterilization by high temperature of the boiling water without damaging the thermometer 2 which has been separated from the pacifier 1.

Another preferred embodiment of the present invention is shown in FIGS. 7, 8, which may be modified from the preferred embodiment as shown in FIGS. 1–6.

The coupling member 13 may be modified to eliminate the two ridge portions 134 and the two projection holes 133, and be modified to form a pair of lugs 136 diametrically on a perimeter of the rear cover 131.

The coupling member 13 is formed with a cylindrical taper portion 130a on a front end portion of the sleeve portion 132, with the taper portion 130a arcuately tapered rearwardly outwardly towards the rear cover 131 of the coupling member 13 to communicate with the shaft hole 130 in the coupling member 13. Such a cylindrical taper portion 130a may help drain the water outwardly through the hole 130 when removed from the hot water bath for sinking the pacifier 1 for sterilization.

The thermometer 2 is formed with a cover hole 28 in a front portion of the disk portion 25 with the cover hole 28 engageable with the rear cover 131 of the coupling member 13, a pair of lug holes 29 diametrically formed on a perimeter of the cover hole 28 for engaging the pair of lugs 136 formed on the coupling member 13, an annular groove 291 annularly recessed under a rim portion 281 confining the cover hole 28 for rotating the pair of lugs 136 in the annular groove 291, and a pair of block portions 292 formed in the annular groove 291 each block portion 292 contiguous to each lug hole 29.

Upon engaging of the two lugs 136 with the two lug holes 29 and rotating the disk portion 25 to deviate the lugs 136 from the lug holes 29 to "lock" the lugs 136 within the groove 291 under the rim portion 281, the pacifier 1 will be coupled with the thermometer 2 for temperature measurement.

Upon disengagement of the lugs 136 of the coupling member 13 from the lug holes 29 in the disk portion 25, the thermometer 2 may then be separated from the pacifier 1.

The thermometer 2 may also be used for measuring a body temperature of an adult when dismantled from the pacifier 1.

When disengaging the projection 24 of the thermometer 2 from the projection hole 133 of the pacifier 1 by rotating (R1) the disk portion 25 as shown in FIG. 6, each projection 24 will be obstructed on each ridge portion 134 for sharply matching the projection 24 with the projection hole 133 without causing any inconvenience.

Similarly, the lug 136 on the pacifier 1, when obstructed by the block portion 292 in the disk portion 25, will sharply match with the lug hole 29 for decoupling the thermometer 2 from the pacifier 1.

The present invention is superior to U.S. Pat. No. 5,178,467 because the pacifier 1 may be completely separated from the thermometer 2 so that the pacifier 1 may be sterilized by boiling or hot water without damaging the thermometer 2 which is separable from the pacifier.

The probe portion 21 and the shaft portion 23 of the thermometer 2 may also be quickly slid into the coupling member 13 of the pacifier 1 by a linear or straight-forward coupling operation, not a rotative coupling as aforementioned.

I claim:

1. A pacifying and temperature measuring means comprising:

a pacifier having a soother member, and a skirt member secured with a coupling member integrally secured with the soother member; and an electronic clinical thermometer detachably securable with said pacifier through said coupling member;

said soother member including: a hollow stem portion, a nipple portion formed on a front end portion of the hollow stem portion to be inserted into a baby's mouth for soothing purpose, a flange portion formed on a rear end portion of the hollow stem portion, and a cylindrical hole formed in the flange portion and in the hollow stem portion; and said skirt member including: a guarding plate, a neck portion formed on a central portion of the guarding plate, a central through hole formed in the neck portion for engaging a coupling member for coupling said thermometer, and an annular recess annularly recessed in a rear end portion of the neck portion of the skirt member;

said coupling member including: a rear cover covering a rear end surface of the flange portion of the soother member and the neck portion of the skirt member, a sleeve portion protruding forwardly from the rear cover and engageable with the cylindrical hole of the soother member, a shaft hole formed through the sleeve portion; and said electronic clinical thermometer including: a probe portion protruding forwardly from a disk portion having a temperature indicating circuit mounted in the disk portion and a digital display formed on a rear surface of the disk portion for visual reading of a temperature data as measured by the thermometer, a temperature sensor formed on a front tip end of the probe portion insertable into the hollow stem portion of the pacifier to contact an inside surface of the nipple portion for sensing temperature in a baby's mouth, a shaft portion protruding forwardly from the disk portion to dispose about the probe portion;

the improvement which comprises:

said coupling member including: a pair of projection holes diametrically formed in a central portion of the sleeve portion each said projection hole radially recessed from a perimeter of the shaft hole, an annular retaining portion annularly formed on a front end portion of the sleeve portion, and a pair of ridge portions diametrically formed on and protruding forwardly from the annular retaining portion with each said ridge portion contiguous to each said projection hole; and said thermometer including a pair of projections diametrically formed on the shaft portion of the thermometer to be engageable with the pair of projection holes formed in the coupling member of the pacifier.

* * * * *